US005736687A

United States Patent [19]

Sellers

[11] Patent Number: 5,736,687
[45] Date of Patent: Apr. 7, 1998

[54] DIGITIZER UTILIZING HEAT SOURCE DETECTION TO RECEIVE INPUT INFORMATION

[75] Inventor: Charles A. Sellers, Houston, Tex.

[73] Assignee: Compaq Computer Corporation, Houston, Tex.

[21] Appl. No.: 700,802

[22] Filed: Aug. 21, 1996

[51] Int. Cl.$^6$ .............................. G08C 21/00; G09G 3/02
[52] U.S. Cl. ............................ 178/18; 178/19; 345/158; 345/175
[58] Field of Search ................................ 178/18, 19, 20; 345/158, 166, 173, 175, 179

[56] References Cited

U.S. PATENT DOCUMENTS

| | | | |
|---|---|---|---|
| 4,561,183 | 12/1985 | Shores | 178/18 |
| 4,873,398 | 10/1989 | Hubby | 178/18 |
| 5,130,794 | 7/1992 | Ritchey | 358/87 |
| 5,239,373 | 8/1993 | Tang et al. | 178/18 |
| 5,347,275 | 9/1994 | Lau | 345/175 |

OTHER PUBLICATIONS

MicroTouch Product Catalog (1996 Edition).
ClearTek Capacitive Touchscreen Kits, MicroTouch Brochure.
Experience the Power of Touch, MicroTouch Brochure.
TouchTek Resistive Touchscreens, MicroTouch Brochure.
TouchPen Solutions, MicroTouch Brochure.
MicroTouch Touch Technologies Backgrounder, MicroTouch Systems, Inc. (May 1996).
Capacitive-Digitizer, MicroTouch Brochure.
Interactive Kiosk Enclosures, Factura Brochure.
Interactive Kiosk Enclosures II, Factura Brochure.
Infrared Detector Products, Servo Brochure (Aug. 2, 1996) (pp. 1–3).
Servo Model 1501 Pyroelectric Detectors, Servo Brochure (Aug. 2, 1996) (pp. 1–2).
Travis, Bill, Smart Sensors, EDN (May 9, 1996) (pp. 57–60, 62, 64–65).
Touch Products: Product and Price Information, Carroll Touch Brochure (Mar. 1996).
Guided Wave Touch Sensors for Flat Panels, Carroll Touch Brochure (Dec. 15, 1995).
Carroll Touch Software Drivers, Carroll Touch Brochure (Dec. 15, 1995).
Modular Controllers, Carroll Touch Brochure (Dec. 15, 1995).
Modular Infrared Touch Frames for Flat Panels, Carroll Touch Brochure (Dec. 21, 1995).
Unitouch, Carroll Touch Brochure (Nov. 6, 1995).
Modular Infrared Touch Frames for CRTs, Carroll Touch Brochures (Nov. 2, 1995).
Infrared Smat-Frames® for CTRs, Carroll Touch Brochure (Feb. 16, 1996).
Touch in a Box, Carroll Touch Brochure (Nov. 2, 1995).
In touch with excellence, ELO TouchSystems, Inc. Brochure (1994).
Touch Power . . . Experience It!, PixelTouch Brochure.
PixelTouch Product Lines Brochure.
Touch Monitors, PixelTouch Brochure.
Product listing of SVGA Monitors.
10.4"Touchscreen LCD, PixelTouch Brochure.
10.4" Active Matrix TFT Color Monitors, Products Brochure for PixelTouch.

(List continued on next page.)

*Primary Examiner*—Curtis Kuntz
*Assistant Examiner*—Vijay Shankar
*Attorney, Agent, or Firm*—Pravel, Hewitt, Kimball & Krieger

[57] ABSTRACT

A heat sensing digitizer is formed on an input area by providing at least two heat sensors at positions fixed relative to the input area. The heat sensors detect heat provided by a heat source, such as a pen with a heated tip. Based on the calculated distance of the tip to each of the heat sensors, the location of the heat sensitive tip in the input area is determined. Multiple sensors further permit detection of the intensity of the heat source or three-dimensional position of the heat source.

28 Claims, 5 Drawing Sheets

OTHER PUBLICATIONS

TouchScreen Technology Comparison.
Touch-TV™ TTV—20R, PixelTouch Brochure.
Touch-Pad™, PixelTouch Brochure.
Custom Kiosks, PixelTouch Brochure.
CD-i 9" Touch Kiosk, PixelTouch Brochure.
Photo-Zip, PixelTouch Brochure.
Product Update, Electronic Products (Aug. 1996) (pp. 49-50).
Product Catalog, Touch Technology (1994).
Falcon II, Brochure of Signs of Intelligence.

DIGITIZER UTILIZING HEAT SOURCE DETECTION TO RECEIVE INPUT INFORMATION

BACKGROUND OF THE INVENTION

1. Field of the Invention

The invention relates to computer user input devices, and more specifically, to a computer digitizer that senses a heated pen.

2. Description of the Related Art

The explosion of the personal computer market has lead to great advances and ease of use of those personal computers. The keyboard and text display has given way to a variety of user input devices for control of graphical interfaces. These input devices either augment or totally replace the keyboard, and include mice, track balls, digitizers pads, touch sensitive screens, among other things.

Touch sensitive screens are used both for displays on standard personal computers, but more commonly in conjunction with notepad computers and dedicated automated stations, such as automated airline ticket dispensers and automated tellers. A requirement of a touch sensitive screen, of course, is that it be clear—as opposed to digitizers, which do not need to transmit light, since a user must see on the screen what is available or present to be able to make a choice or control decision.

So far as is known, there have been three principal technologies used for touch sensitive screens. These are known as capacitive technology, resistive technology, and surface acoustic wave (SAW) technology.

Resistive technology typically used a voltage gradient on a plastic on glass membrane overlay to sense touch. For example, a five wire sense system created a voltage gradient on the bottom layer, and the top layer senses that voltage. The screens two layers were coated with a thin, clear conductive metal oxide on their facing sides and held apart by a layer of materials composed of spacer dots. Along the edges of the sensor was electrode pattern. The controller dispersed a uniform voltage field across the sensor and then measured the voltage on the glass layer at the location where a user's finger or other indicator object pressed the two layers together. The sensed voltage was then translated into a set of digital touch coordinates by a controller and sent to a host computer.

Capacitive digitizer technology typically used an all glass sensor with a transparent, thin film conductive coating fused to its surface. Along the edges was a narrow, precisely printed electrode pattern that uniformly distributed low voltage, AC field over the conduct layer. When a finger made contact with the screen surface, it "capacitively coupled" with the voltage field, drawing a minute amount of current to the point of contact. The current flow from each corner was proportional to the distance to the finger and the ratios of these flows were measured by the controller and used to locate the touch.

Surface acoustic wave (SAW) technology provided a glass panel with transducers that transmitted and received surface waves over the face of the screen. When a finger or other object touched the screen, a portion of the energy of the wave was absorbed at the touch location. This location could then be determined based on the presence of interference patterns caused in the acoustic wave.

SUMMARY OF THE INVENTION

Briefly, the present invention provides a new and improved system for receiving input information from a user based on the location of a heat source. The heat sensing digitizer according to the present invention includes an input area with at least two heat sensors located at fixed locations relative to the surface. The heat sensors detect the presence of a heat source and provide a signal representative of the distance from each heat sensor to the heat source. The location of the heat source on the surface is then calculated from the two determined distances.

Further, multiple heat sensors can provide an indication of the intensity of the heat source, representing the pressure of a heat sourcing pen on the input area, for example. Multiple sensors can also provide a three-dimensional location of the heat source.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
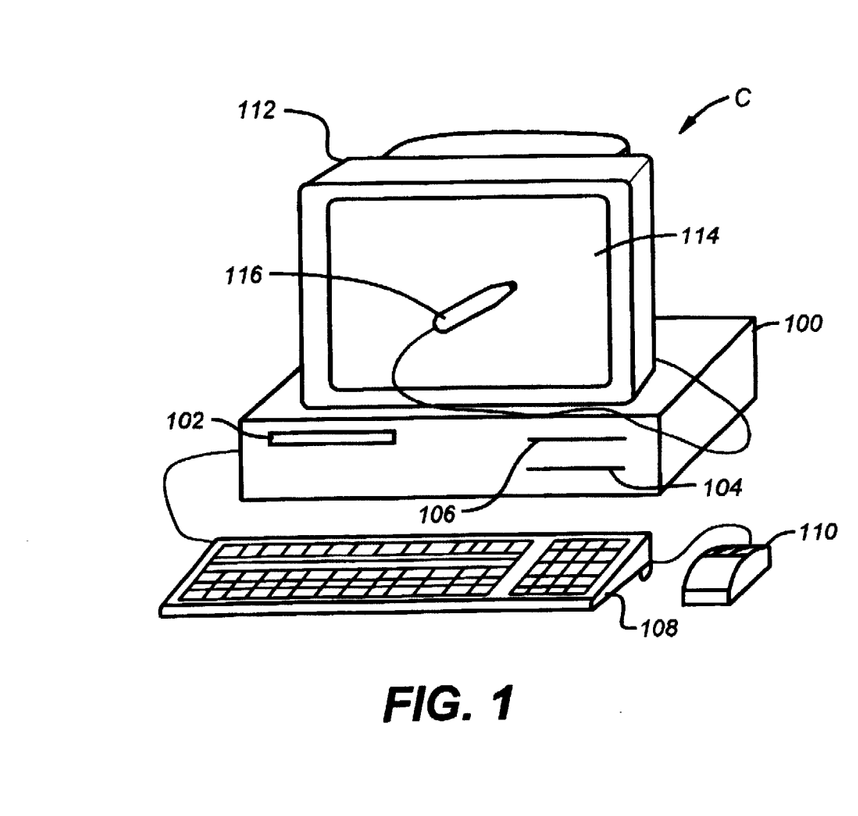
FIG. 1 is an isometric drawing of a computer system with display screen according to the present invention.

Turning to FIG. 1, a typical computer system C is shown according to the invention. The computer system C includes a primary circuit board (not shown) within a chassis 100. The circuit board provides system storage through various storage devices, including a CD ROM drive 102, a floppy disk drive 104, and a hard disk drive 106. The circuit board also provides a keyboard 108 and a mouse 110. The circuit board provides display data for a video display 112, which includes a heat sensing digitizer 114 according to the invention. A heat source pen 116 forms the heat source for the digitizer 114 and is either coupled to the computer system C or is standalone with internal batteries. The details of the heat sensing digitizer 114 are further discussed in conjunction with FIG. 6, and details of the heat source pen 116 are discussed in conjunction with FIG. 5.

Figure 2:
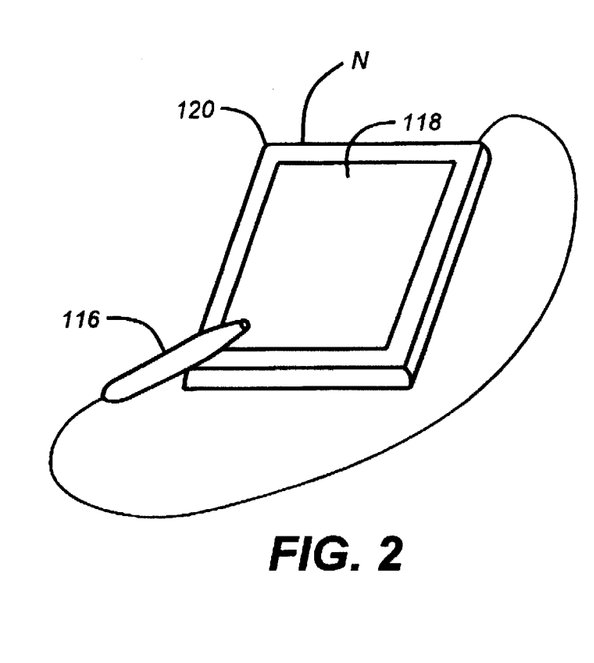
FIG. 2 is an isometric drawing of a notepad computer system with display screen according to the present invention.

Turning to FIG. 2, a notepad computer N is shown implemented according to the invention. Again, a heat sensing digitizer 118 is provided for use with the heat source pen 116, which may be the sole input device for the notebook computer N. A chassis 120 houses the electronics necessary to operate the notebook computer N.

Figure 3:
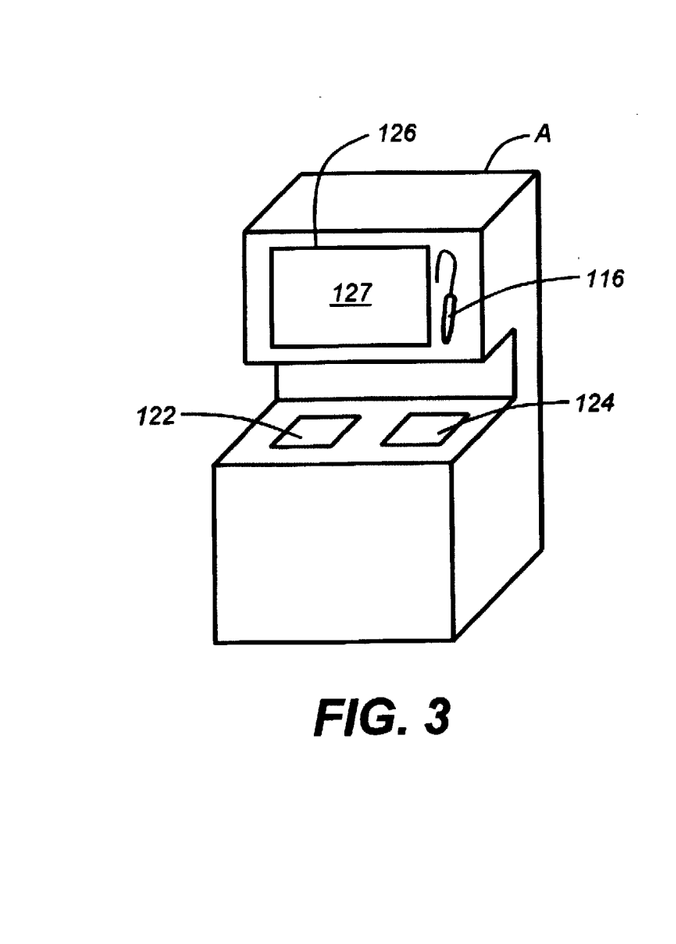
FIG. 3 is an isometric drawing of an automated teller system with display screen according to the present invention.

Turning to FIG. 3, an automated teller system A is shown implemented according to the invention. The automated teller system A preferably includes a dispenser 122 for money, tickets, and other materials typically provided by automated tellers and has an input 124 for, for example, credit cards. A display 126 again has a heat sensing digitizer 127 according to the invention.

Figure 4:
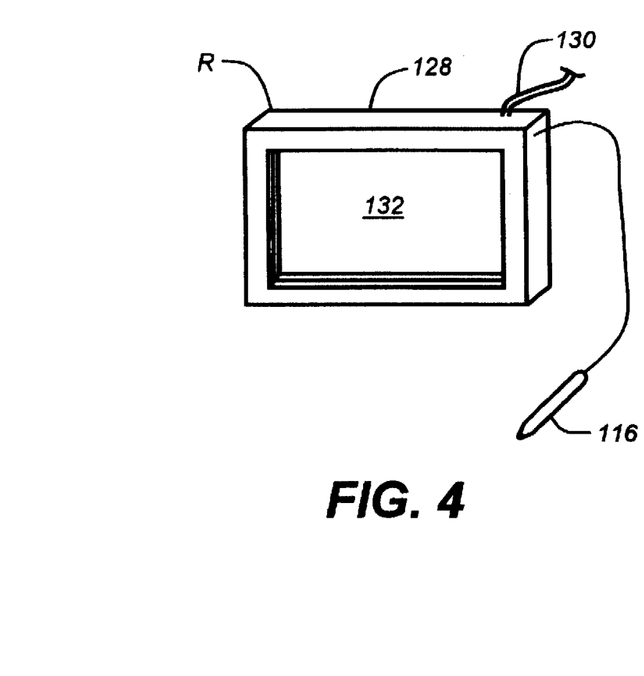
FIG. 4 is an isometric drawing of a retrofit overlay display screen according to the present invention.

Turning to FIG. 4, a retrofit device R is illustrated for use with existing displays, such as the display 112 of FIG. 1. The retrofit device R has a clear screen 132, a frame 128, an input/output (I/O) cable 130, and the heat source pen 116. This retrofit device R optionally omits the clear screen 132, instead using as an input area the actual screen of the display 112 of FIG. 1.

Figure 5:
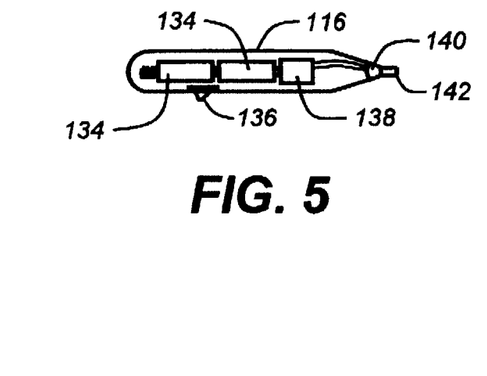
FIG. 5 is a cross-sectional view of a heat sourcing pen for use according to the present invention.

Turning to FIG. 5, the details of the heat source pen 116 implemented according to the invention are shown. The heat source pen 116 includes batteries 134, an on/off switch 136, and drive electronics 138. The drive electronics 138 heat a heat conducting tip 140, for example between 140° and 200° F. An activation tip 142, which can be pressure sensitive, activates the heat conducting tip 140. Further, if the activation tip 142 is pressure sensitive, the electronics 138 sense the amount of pressure on the tip 142 and heat the tip 140 to varying degrees depending on that pressure. Alternatively, a user can simply turn the tip 140 on and off with the switch 136, or can use the switch to turn on the electronics 138 to heat the tip 140 to a fixed temperature in response to the activation tip 142. One skilled in the art will appreciate that a wide variety of point heat sources can be used according to the invention. In appropriate cases, even the heat of a fingertip can provide the heat necessary to activate the heat sensing digitizer 114, 118, or 127 according to the invention.

Figure 6:
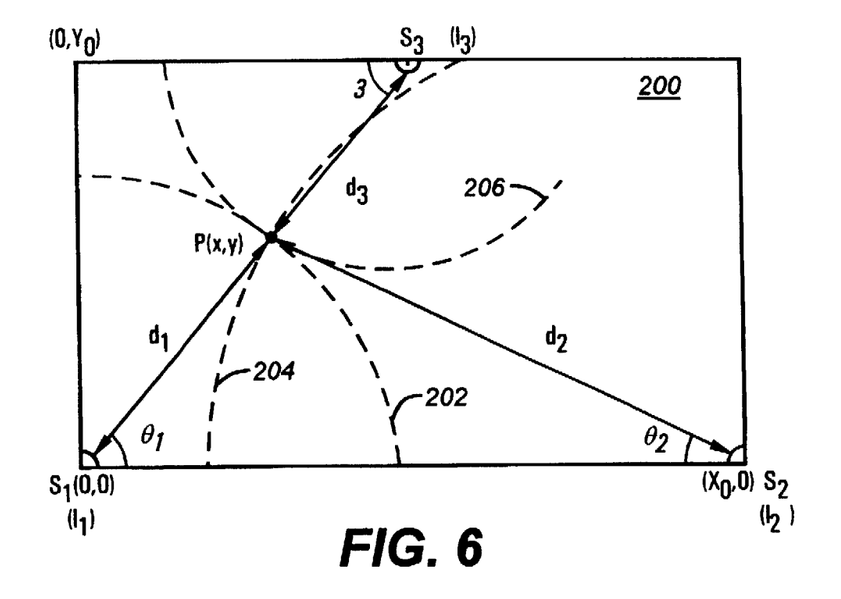
FIG. 6 is a diagram of a display screen illustrating the positional relationship of heat sensors and the pen of FIG. 5.

Turning to FIG. 6, a diagram of a screen 200 illustrates the operation of the heat sensing digitizer 114, 118, or 127 according to the invention. The screen 200 forms the boundaries of a two-dimensional input area, with three pyroelectric sensors $S_1$, $S_2$, and $S_3$ located at a lower left corner, a lower right corner, and an upper middle position of the screen 200 (such as along the periphery of the frame 128 of FIG. 4). The pyroelectric sensors $S_1$, $S_2$, and $S_3$ are preferably standard pyroelectric sensors known to the art. Such sensors typically source either voltage or current (preferably voltage sourcing in the disclosed embodiment), and provide that voltage or current as a rising function of a sensed temperature. Other sensors, such as infrared sensors, could also be adapted for sensing the heat source.

When the heat source pen 116 is brought into contact with the screen 200 illustrated in FIG. 6, the tip 140 heats responsive to the activation tip 142. Each of the three pyroelectric sensors $S_1$, $S_2$, and $S_3$ then provide an elevated reading in response to sensing the heat from the tip 140. Pyroelectric sensors are not directional, but do vary in response depending on their distance from a heat source. Therefore, each of the pyroelectric sensors $S_1$, $S_2$, and $S_3$ will provide a voltage level (in the disclosed embodiment) representing the heat intensity it is sensing; here, illustrated as intensities $I_1$, $I_2$, and $I_3$. The distance versus intensity function will be known, and is preferably the same for each of the pyroelectric sensors. Therefore, three distance curves 202, 204, and 206 at distances $d_1$, $d_2$, and $d_3$ from the corresponding sensor $S_1$, $S_2$, and $S_3$ are determined from the intensities $I_1$, $I_2$, and $I_3$. These three distance curves 202-206 intersect at a point P(x,y).

Each distance $d_1$, $d_2$, and $d_3$ for the corresponding sensor $S_i$, $S_2$, and $S_3$ is a function of both that sensor's returned intensity $I_1$, $I_2$, and $I_3$, and a base intensity $I_0$ of the pen 116. This results in the following equations.

$$d_1 = f(I_1, I_0)$$

$$d_2 = f(I_2, I_0)$$

$$d_3 = f(I_3, I_0)$$

It will be appreciated from FIG. 6, however, that the point P(x,y) can be determined from just two of the intensities $I_1$ and $I_2$. That is, the distances $d_1$ and $d_2$ are sufficient to determine P(x,y). However, if the y-axis deflection is low, any error in the distance $d_1$ or $d_2$ would result in rather large changes in the calculated y-axis position. Therefore, the third sensor $S_3$ improves accuracy.

As will be further appreciated, by using three sensors the system does not need to know the actual pen intensity $I_0$. Assuming a linear, exponential, or inverse square type of function (or another rising function) for each distance $d_n$ as a function of intensity $I_n$, $I_0$ can be calculated based on the three intensities $I_1$, $I_2$, and $I_3$. That is:

$$I_0 = f(I_1, I_2, I_3)$$

Therefore, it is possible to calculate P(x,y) without knowing $I_0$:

$$P(x,y) = f(I_1, I_2, I_3,)$$

Alternatively, the initial $I_0$ can be determined based on a calibration routine by having the user press the pen 116 on a certain point whose distance from each sensor $S_n$ is known. $I_0$ can then be determined based on the known distances $d_1$, $d_2$, and $d_3$ from that point in conjunction with the returned intensities $I_1$, $I_2$, and $I_3$.

But the capability of determining $I_0$ as a function of $I_1$, $I_2$, or $I_3$ further allows the system to calculate "z-axis" information. In two-dimensional digitizer terminology, "z-axis" generally represents a sensed pressure. If the intensity of the tip 140 varies based on the pressure on the activation tip 142, $I_0$ will therefore vary based on that pressure. But $I_0$ can be calculated as a function of $I_1$, $I_2$, and $I_3$, so the intensity values $I_1$, $I_2$, and $I_3$ can be used to determine both P(x,y) and a z-axis value (i.e., a pressure value).

Figure 7:
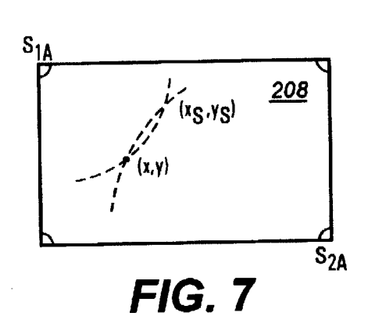
FIGS. 7–9 are diagrams of display screens illustrating alternative sensor placements according to the invention.
Figure 8:
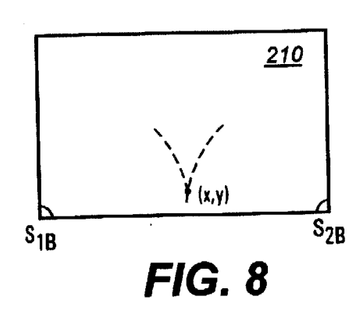

Turning to FIG. 7, an alternative implementation using two sensors $S_{1A}$ and $S_{2A}$ in the upper left and lower right corners of a screen 208 is illustrated. Such a configuration is not preferable, because the distance curves not only intersect at points (x,y) but also at ($x_S$, $y_S$), leading to an ambiguity of pen 116 location. Therefore, if only two sensors are used, it is preferable to implement a two sensor system as illustrated in FIG. 8, where two sensor, $S_{1B}$ and $S_{2B}$ are located in the lower left and lower right corners of a screen 210. The (x,y) position illustrated in FIG. 8, however, could suffer from rather large errors in the determined y-axis value if the distances from the sensors $S_{1B}$ and $S_{2B}$ are at all in error.

Figure 9:
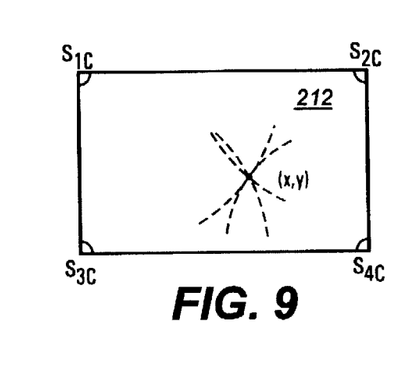

Turning to FIG. 9, shown is a four sensor implementation with sensors $S_{1C}$, $S_{2C}$, $S_{3C}$, and $S_{4C}$, each positioned at a corner of a screen 212. Using this configuration, the system is more accurate both in the z-axis calculation and in determining the position P(x,y) of the heat source.

Figure 10:
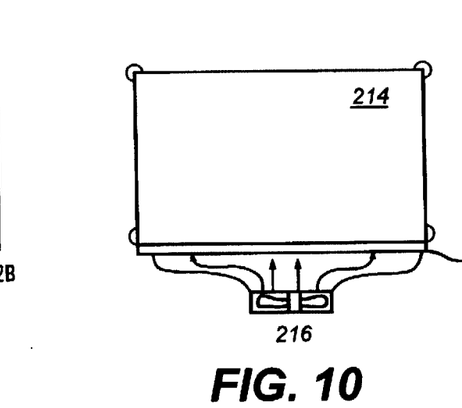
FIG. 10 is a diagram of a display screen with a fan and cooling system for use with the heat sensing digitizer according to the invention.

Turning to FIG. 10, an embodiment with a screen 214 and a fan 216 is shown. This fan 216 can blow cool air, either from a cool air source or across a thermoelectric cooler 218, to maintain the surface of the screen 214 fairly constant. This may be desirable in environments in which the temperature can vary on the screen 214.

Figure 11:
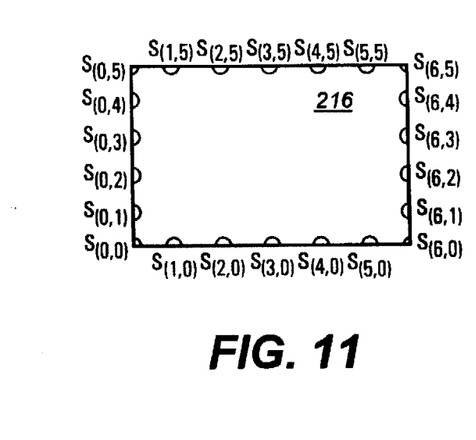
FIG. 11 is a diagram of a display screen illustrating a sensor array according to the invention.

FIG. 11 shows another alternative embodiment of a display screen according to the invention. A display screen 216 in this case is surrounded by an array of sensors, designated $S_{(x,y)}$. This array of sensors further enhances the accuracy of position location as well as the ability to determine the intensity of the heat from the pen 116.

As will be appreciated from FIGS. 6–10, a wide variety of sensor locations are possible. Further, as will be appreciated, a wide variety of heat sources can be used. This is especially true in a three or four sensor system, because the intensity of the heat source can be calculated from the intensities detected by the sensors. Further, not only the pen 116 could be used, but a finger may be suitable for certain controlled environments. It should also be appreciated that the heat sensing digitizer can be used absent a display screen, as a standard digitizer pad.

It will be appreciated that a wide variety of other embodiments could be implemented without departing from the spirit of the invention. For example, using multiple pyroelectric sensors positioned in three dimensions, a true three-dimensional input can be achieved using a three-dimensional input area. Also, virtually any device that requires x,y or x,y,z type input can use the heat sensing digitizer according to the invention.

Further, although the input areas of FIGS. 1–11 are shown as the boundaries of a screen, it should be appreciated that the input area could in fact extend beyond the edges of the plane bounded by the sensors, or could instead be contained inside the area bounded the sensors. That is, it is not necessary that the sensors be located precisely along the corners or sides of the input area, but they could be further away from the input area, or contained within the input area. One will appreciate that the techniques according to the invention still have application regardless the size of the input area and its relationship to the sensors.

Figure 12:
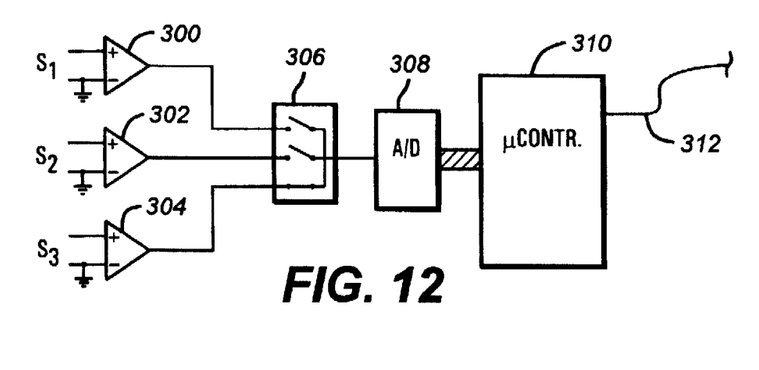
FIG. 12 is a schematic block diagram of the position detection electronics for use according to the invention.

Turning to FIG. 12, electronics are shown for detecting the intensities $I_1$, $I_2$, and $I_3$ from the sensors $S_1$, $S_2$, and $S_3$, and for calculating the position of the pen 116. Three amplifiers 300, 302, and 304 are connected to the outputs of the sensors $S_1$, $S_2$, and $S_3$ of FIG. 6. These amplifiers can be constructed within the frame of the digitizer itself, such as the frame 128 of FIG. 4, or can be implemented within the control system of the computer, such as within the notebook computer N of FIG. 2. Precise location is not critical. Preferably, the output of each amplifier 300–304 is provided to a high speed analog multiplexer 306, so the outputs of each amplifier 300–304 can be selectively switched by the multiplexer 306 into an analog-to-digital (A/D) converter 308. In this way, a single A/D converter 308 suffices, although separate A/D converters could instead be used for each amplifier 300–304. The output of the A/D converter 308 is provided to a microcontroller 310, which controls the A/D converter 308 and the multiplexer 306. The microcontroller 310 preferably executes a routine to repeatedly calculate both the position of a heat source 226 and its intensity. This microcontroller 310 provides output location and z-axis (i.e., pressure) signals over an I/O link 312, preferably digital, for use by one of the systems of FIGS. 1–4.

Figure 13:
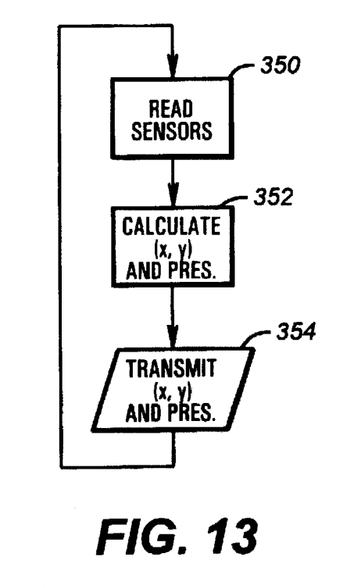
FIG. 13 is a flowchart illustration of a detection routine implemented in a microcontroller according to the invention.

Turning to FIG. 13, a flowchart illustrates the operation of the microcontroller 310. Preferably the microcontroller 310 repeatedly executes a routine beginning at step 350, where the microcontroller 310 reads the intensities $I_1$, $I_2$, and $I_3$ from the sensors $S_1$, $S_2$, and $S_3$ through the amplifiers 300, 302, and 304. This is done by switching the multiplexer 306 to first connect the output of the amplifier 300 to the input of the A/D converter 308 and then performing a conversion through the A/D converter 308, providing a digital signal representative of the intensity $I_1$ from the sensor $S_1$. The microcontroller 310 reads this data value through an input port. Next, the multiplexer 306 is switched to the amplifier 302 whose output is digital by the A/D converter 308, with the digitized intensity $I_2$ being provided to the microcontroller 310. Finally, the output of the amplifier 304 is coupled to the A/D converter 308 through the multiplexer 306, thus providing the intensity I3 to the microcontroller 310.

Proceeding to step 352, the (x,y) position and pressure (z-axis position) are calculated. As an initial step, if none of the sensors $S_1$, $S_2$, or $S_3$ has provided an intensity $I_1$, $I_2$, or $I_3$ high enough to indicate the presence of the pen 116, the microcontroller 310 provides an output signal indicating that the pen 116 is not present or has not been activated. If the heat source from the tip 140 is present, however, the intensities are used to calculate the P(x,y) position of the heat source, as well as the intensity $I_0$ of the heat source (and the corresponding pressure on the activation tip 142).

Proceeding to step 354, the microcontroller 310 transmits the P(x,y) position data and the pressure data over the communications link 312, such as to one of the computers of FIGS. 1–4 for use by a graphical user interface.

Figure 14:
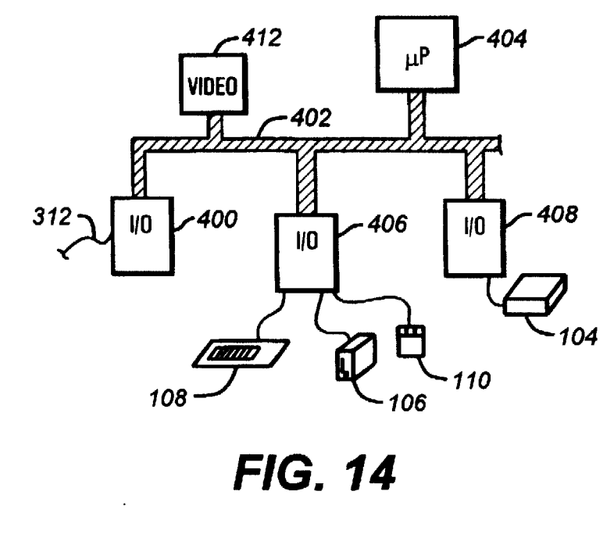
FIG. 14 is a block diagram illustrating electronics of a computer system implemented with the heat sensing digitizer according to the invention.

Turning to FIG. 14, a block diagram illustrates typical components of the computer system S of FIG. 1 for using the data from the microcontroller 310. Preferably the data from the microcontroller 310 is received over the communications link 312 by an I/O device 400, such as a high speed serial I/O device or a parallel I/O device. This data is then sent over a bus 402 for processing by a microprocessor 404, such as a Pentium® type microprocessor by Intel Corporation. The microprocessor 404 also preferably responds to an I/O device 406, which controls, for example, the keyboard 108, the mouse 110, and the floppy drive 106. The microprocessor 404 also preferably responds to an I/O device 408, which controls the hard disk drive 104. Based on the input from the mouse 110 and the keyboard 108, and the digital data from the data link 312, the operating system software of the computer controls the display 112 through a video controller 412. In this way, data from the digitizer 114 of FIG. 1 forms an input to the graphical user interface.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A heat sensing digitizer input system for receiving input information from a user through detection of a heat source, comprising:

an input area;

a first heat sensor located at a first position fixed relative to said input area, said first heat sensor providing a signal representing a first intensity received from the heat source;

a second heat sensor located at a second position fixed relative to said input area, said second heat sensor providing a signal representing a second intensity received from the heat source; and detection electronics coupled to said first heat sensor and said second heat sensor and receiving the first signal and the second signal for providing data representing the location of the heat source relative to the input area.

2. The input system of claim 1, wherein said input area is bounded by a computer display screen.

3. The input system of claim 2 further including a microprocessor for computing data to be displayed on said display screen.

4. The input system of claim 3, wherein said detection electronics comprise a microcontroller separate from said microprocessor.

5. The input system of claim 1, wherein said input area comprises a remote data entry terminal display screen.

6. The input system of claim 5, wherein said remote data entry terminal comprises an automated teller machine.

7. The input system of claim 1, wherein said input area comprises retrofit overlay for a computer display screen.

8. The system of claim 1 further comprising a third heat sensor located at a third position fixed relative to said input area, said third heat sensor providing a third signal representing a third heat intensity received from the heat source, wherein said detection electronics are further coupled to said third sensor and receive the third signal.

9. The system of claim 8 further comprising a plurality of additional heat sensors located at fixed positions relative to said input area, said plurality of additional heat sensors providing a plurality of additional signals representing a plurality of heat intensities received from the heat source, wherein said detection electronics are further coupled to said plurality of additional sensors and receive the plurality of additional signals.

10. The heat sensing digitizer of claim 8 further comprising a fourth heat sensor located at a fourth position fixed relative to said input area at a position off of said input surface wherein said first, second, third, and fourth heat sensors are in more than one plane, wherein said input area is a three-dimensional area, and wherein said detection electronics further provides three-dimensional position data.

11. The heat sensing digitizer of claim 1, wherein said first and second heat sensors are pyroelectric sensors.

12. The heat sensing digitizer of claim 1, wherein said first and second heat sensors are infrared sensors.

13. The heat sensing digitizer of claim 1, wherein the heat source is variable dependent on a pressure upon said input surface, and wherein said detection electronics further provides a signal representative of the pressure of the heat source on said input area.

14. The input system of claim 1, wherein said detection electronics provide the position of a heat source which is a pen with a heated tip.

15. The input system of claim 1, wherein said detection electronics provide the position of a heat source which is a human finger.

16. A computer system comprising:
   a microprocessor for data computation and processing;
   a display for forming images of said data; and
   a heat sensing digitizer input system for receiving input information from a user through detection of a heat source, comprising:
      an input area;
      a first heat sensor located at a first position fixed relative to said input area, said first heat sensor providing a signal representing a first intensity received from the heat source;
      a second heat sensor located at a second position fixed relative to said input area, said second heat sensor providing a signal representing a second intensity received from the heat source; and
      detection electronics coupled to said first heat sensor and said second heat sensor and receiving the first signal and the second signal for providing data representing the location of the heat source relative to the input area.

17. The computer system of claim 16, wherein said input area is bounded by said display.

18. The computer system of claim 16, wherein said detection electronics comprise a microcontroller separate from said microprocessor.

19. The computer system of claim 16, wherein said input area comprises a remote data entry terminal display screen.

20. The computer system of claim 19, wherein said remote data entry terminal comprises an automated teller machine.

21. The computer system of claim 16 further comprising a third heat sensor located at a third position fixed relative to said input area, said third heat sensor providing a third signal representing a third heat intensity received from the heat source, wherein said detection electronics are further coupled to said third sensor and receive the third signal.

22. The computer system of claim 21 further comprising a plurality of additional heat sensors located at fixed positions relative to said input area, said plurality of additional heat sensors providing a plurality of additional signals representing a plurality of heat intensities received from the heat source, wherein said detection electronics are further coupled to said plurality of additional sensors and receive the plurality of additional signals.

23. The computer system of claim 21 further comprising a fourth heat sensor located at a fourth position fixed relative to said input area at a position off of said input surface wherein said first, second, third, and fourth heat sensors are in more than one plane, wherein said input area is a three-dimensional area, and wherein said detection electronics further provides three-dimensional position data.

24. The computer system of claim 16, wherein said first and second heat sensors are pyroelectric sensors.

25. The computer system of claim 16, wherein said first and second heat sensors are infrared sensors.

26. The computer system of claim 16, wherein the heat source is variable dependent on a pressure upon said input surface, and wherein said detection electronics further provides a signal representative of the pressure of the heat source on said input area.

27. The computer system of claim 16, wherein said detection electronics provide the position of a heat source which is a pen with a heated tip.

28. The computer system of claim 16, wherein said detection electronics provide the position of a heat source which is a human finger.

* * * * *